United States Patent

Schindler et al.

[11] Patent Number: 5,597,173
[45] Date of Patent: Jan. 28, 1997

[54] ATTACHMENT APPARATUS FOR CONTROLLING ROTATIONS OF A TENSION STRUT

[75] Inventors: James H. Schindler, Novi; Robert W. Haberstroh, Farmington Hills; John B. Hicks, Ann Arbor, all of Mich.

[73] Assignee: Ford Motor Company, Dearborn, Mich.

[21] Appl. No.: 414,822

[22] Filed: Mar. 31, 1995

[51] Int. Cl.⁶ .............................. B60G 3/20; B60G 7/02; F16F 1/36
[52] U.S. Cl. .................. 280/690; 280/701; 267/141; 267/280; 267/293
[58] Field of Search ................... 280/690, 701, 280/697, 688, 673, 724, 725, 726, 716, 717; 267/141, 141.1, 293, 292, 258, 257, 248, 280, 279, 281

[56] References Cited

U.S. PATENT DOCUMENTS

| | | |
|---|---|---|
| 2,626,797 | 1/1953 | Cuskie . |
| 2,757,017 | 7/1956 | Matthias et al. . |
| 2,852,269 | 9/1958 | Gaines . |
| 3,024,040 | 3/1962 | Muller ............................... 280/701 |
| 3,079,137 | 2/1963 | Schilberg ........................... 267/248 |
| 3,552,785 | 1/1971 | Elder et al. ....................... 280/716 |
| 3,622,194 | 11/1971 | Bryk . |
| 3,809,427 | 5/1974 | Bennett ............................. 267/141 |
| 4,269,432 | 5/1981 | Inoue et al. . |
| 4,391,436 | 7/1983 | Fishbaugh ....................... 267/141.1 |
| 4,575,114 | 3/1986 | Camp ............................... 280/673 |
| 4,641,855 | 2/1987 | Izumi ................................. 267/258 |
| 4,783,039 | 11/1988 | Peterson et al. ................. 267/281 |
| 5,131,638 | 7/1992 | Hein et al. . |
| 5,170,985 | 12/1992 | Killworth et al. .............. 267/141.1 |

FOREIGN PATENT DOCUMENTS

| | | |
|---|---|---|
| 602953 | 8/1960 | Canada . |
| 0286073 | 10/1988 | European Pat. Off. . |
| 58-126206 | 7/1983 | Japan . |

Primary Examiner—Brian L. Johnson
Assistant Examiner—Peter C. English
Attorney, Agent, or Firm—Gregory P. Brown

[57] ABSTRACT

A suspension attachment apparatus (46) suitable for use in a motor vehicle having a tension strut (42) interposed and connecting a chassis (10) to a wheel support member (26) is described. The apparatus (46) ensures proper orientation of the suspension member (42) during the assembly process. Additionally, the apparatus provides vibration isolation while limiting rotation of the suspension member (42) relative to the chassis (10) within a predetermined range.

7 Claims, 2 Drawing Sheets

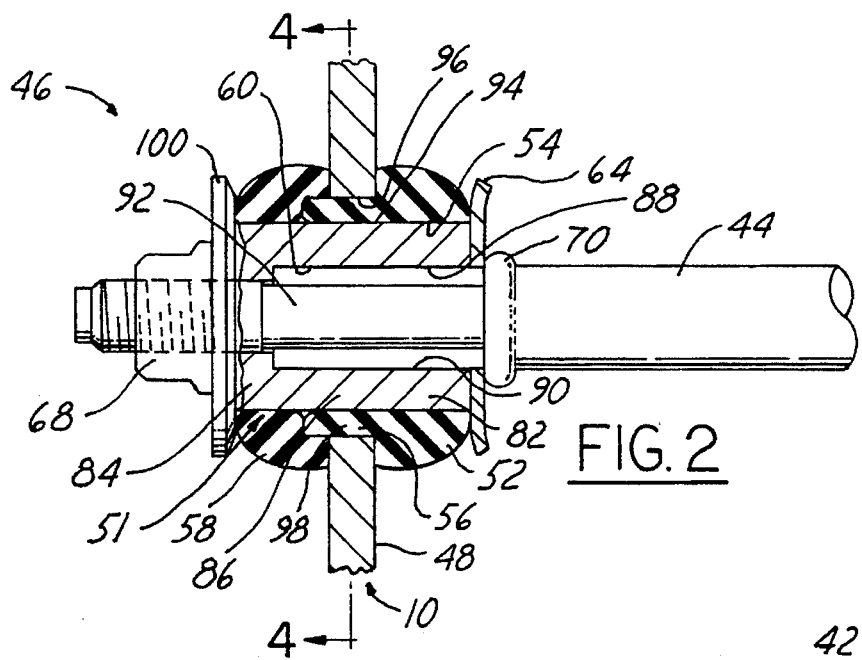
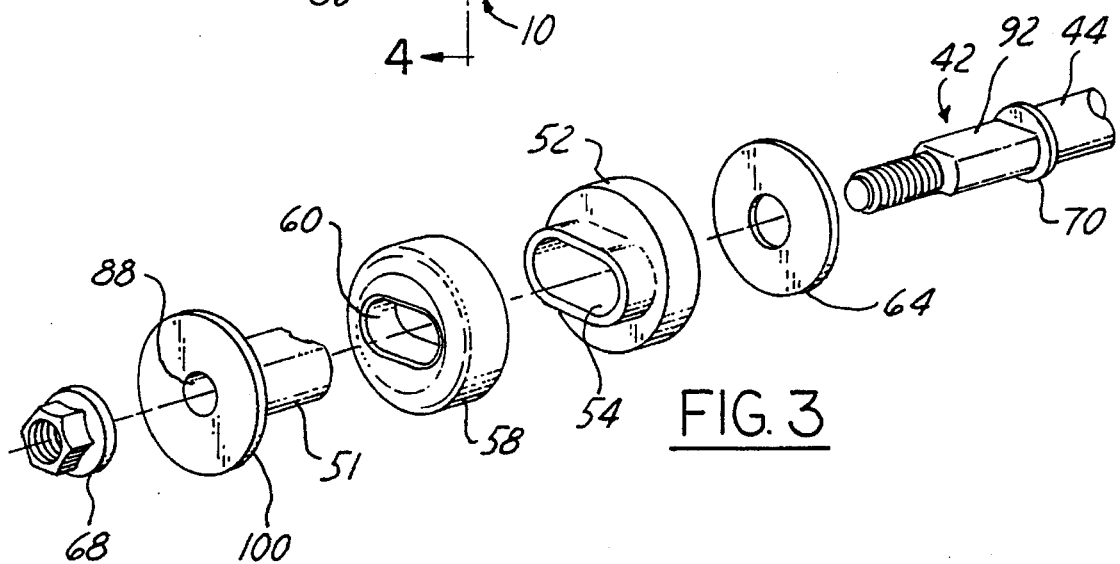
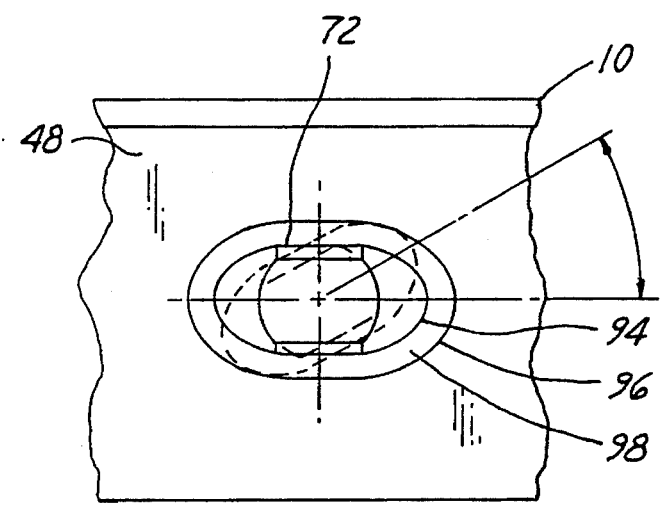

5,597,173

1

ATTACHMENT APPARATUS FOR CONTROLLING ROTATIONS OF A TENSION STRUT

BACKGROUND OF THE INVENTION

1. Field of the Invention

This invention generally relates to suspension systems for motor vehicles. More specifically, the present invention relates to an attachment apparatus for retaining a tension strut on an independent suspension in a predetermined orientation by controlling rotations of the tension strut.

2. Disclosure Information

Commonly, independent suspension systems utilize a tension strut for positively locating the wheel assembly against longitudinal forces acting upon the suspension. Generally, the tension strut attaches to the chassis and the wheel support member using a compliant, vibration absorbing attachment. Without the compliant attachment, objectionable noise, vibration and harshness would be transmitted from the wheel assembly through the tension strut into the vehicle chassis at the attachment. Of the vibrations being transmitted through the tension strut, isolation is principally directed to axial and transverse linear vibrations of the longitudinal tension strut. Radial isolation heretofore has not been required. The suspension itself imposes no significant radial vibrations on the tension strut.

Recent developments have made it desirable to incorporate a tension strut design having a radius of curvature, rather than being straight. This provides greater flexibility when packaging the tension strut with neighboring components than a straight tension strut. However, the radius of curvature creates a mass moment about an installed axis of rotation. Unresisted, this mass moment would cause the tension strut to rotate about this axis. Two new challenges are presented by the introduction of this moment in tension struts. First, when the vehicle is operated, the moment imparts a radial vibration component in the tension strut that can no longer be considered insignificant from a noise, vibration and harshness standpoint. Second, the rotation of the tension strut must be controlled to prevent interference with the neighboring components.

It would be desirable to provide an apparatus that would retain a tension strut having a radius of curvature in a predetermined orientation as installed. It would be further desirable to provide an apparatus that would isolate radial vibrations in addition to the longitudinal and transverse vibrations occurring in a tension strut having a radius of curvature. Finally, it would be desirable to provide an apparatus that would ensure that the tension strut would not exceed a predetermined maximum radial displacement.

SUMMARY OF THE INVENTION

According to the present invention, a suspension attachment apparatus is disclosed for use in a vehicle suspension having an elongate suspension member interposed and connecting a chassis to a wheel support member. The suspension attachment apparatus includes a first elastomeric body having a first aperture and a second elastomeric body having a second aperture. The two elastomeric bodies are adapted to be axially aligned with the first aperture when they are clamped to the chassis.

The attachment apparatus also includes a sleeve having a first portion disposed in the first aperture, a second portion opposite the first portion and disposed in the second aperture. There is a center portion disposed between the first and second portions. The sleeve further includes a bore passing through the sleeve for receiving the tension strut therein and operatively preventing relative rotation between the tension strut and the sleeve.

The center portion of the sleeve includes a non-circular outer circumference for engaging a non-circular chassis aperture disposed on the chassis and forming a region therebetween. This region permits rotations within a predetermined range of the sleeve and the tension strut relative to the chassis.

An advantage of this system is its ability to secure a tension strut in a predetermined orientation as installed while ensuring that the tension strut does not exceed a predetermined range of radial displacement.

BRIEF DESCRIPTION OF THE DRAWINGS

FIG. 2 is a plan, partially sectioned view of a suspension attachment according to the present invention.

FIG. 3 is an exploded perspective view of the tension strut and suspension attachment according to the present invention.

FIG. 4 is a cross-sectional view taken along line 4—4 of FIG. 2.

DETAILED DESCRIPTION OF THE PREFERRED EMBODIMENTS

Figure 1:
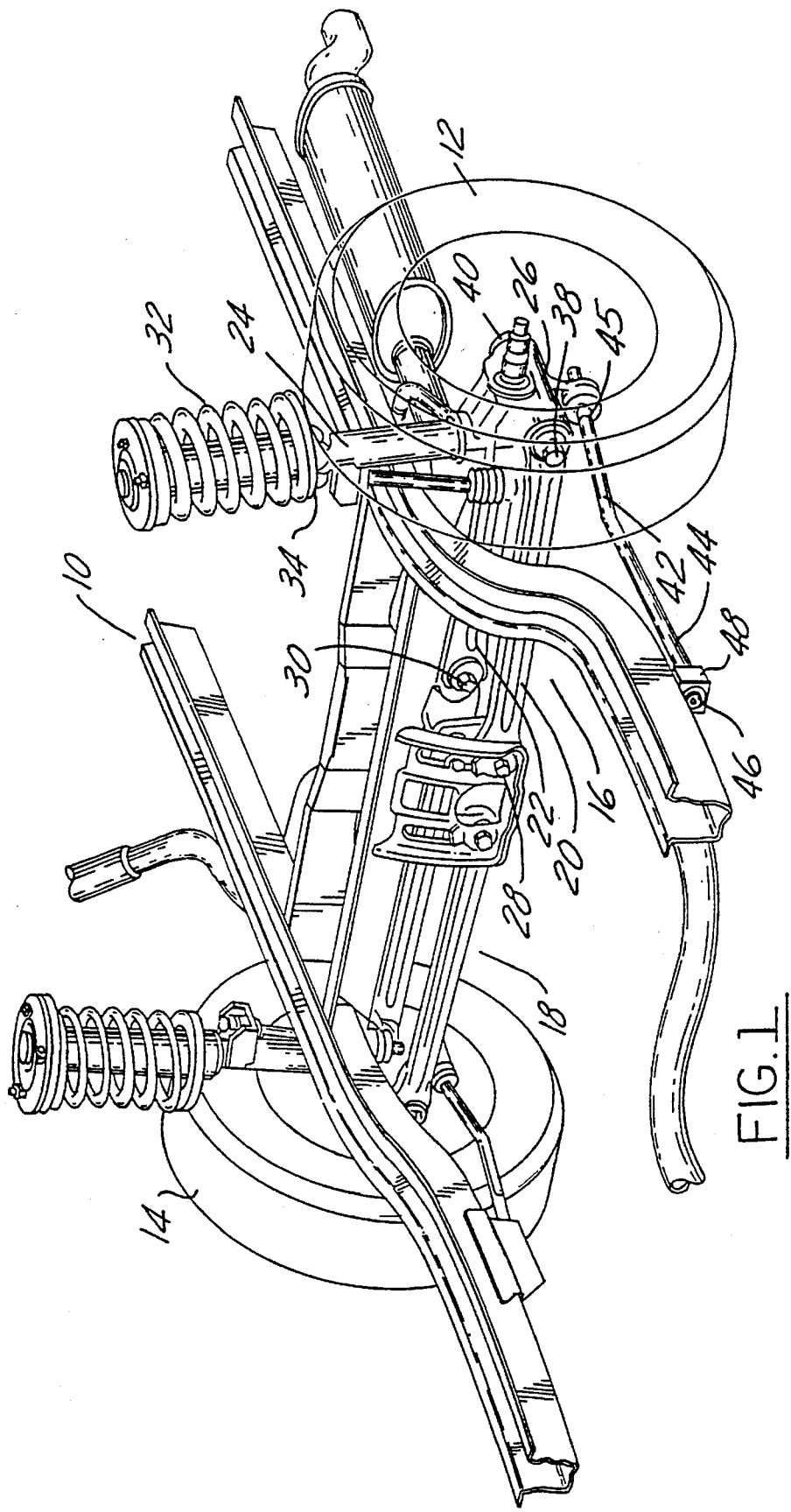
FIG. 1 is a perspective view of an independent rear wheel suspension for a motor vehicle.

Referring now to FIG. 1, a motor vehicle chassis 10, also referred to as a sprung mass, includes left and right independent rear suspensions 16, 18, respectively, supporting left and right road wheels 12, 14. Each wheel suspension 16 and 18 is identical except that one is a mirror image of the other. Since each independent suspension is the same, reference will only be made to the left wheel suspension.

Generally, as shown in FIG. 1, the wheel suspension 16, also referred to as an unsprung mass, includes a front transverse control arm 20 having an inboard end 28 and an outboard end 38, a rear transverse control arm 22 having an inboard end 30 and an outboard end 40, and a telescopic damper 24 which connects a wheel support member 26 to the motor vehicle chassis 10. The pair of inboard ends 28, 30 are pivotably connected to the chassis 10 and the pair of outboard ends 38 and 40 are connected to the wheel support member 26. A coil spring 32, coaxially disposed on the telescopic damper 24 communicates the chassis 10 loads to the wheel support member 26 through a lower spring seat 34.

The suspension 16 further includes a longitudinally disposed elongated suspension member, such as tension strut 42. Strut 42 limits the longitudinal displacements of the wheel support member 26 under dynamic loading, such as braking or accelerating and impacting road irregularities. An isolator 45 resiliently mounts the tension strut 42 to the vehicle wheel support member 26 and a suspension attachment 46 secures the forward end 44 of the tension strut to the chassis 10.

As shown in FIGS. 2–3, the forward end 44 of the tension strut 42 is disposed within a suspension attachment 46 which is clamped to a chassis bracket 48 disposed on the chassis 10. The attachment 46 includes a sleeve 51 disposed within first and second generally cylindrical elastomeric bodies 52 and 58. The first elastomeric body 52 includes a first aperture 54 disposed therethrough and adapted to axially align with a second aperture 60 in the second elastomeric body 58.

The sleeve 51 includes a first portion 82 for insertion in the first aperture 54 and a second portion 84 opposite the first portion 82 for insertion in the second aperture 60. A center portion 86 is located between the first and second portions 82, 84. The center portion 86 of the sleeve 51 has a non-circular outer circumference 94 for engaging a non-circular chassis aperture 96 within the chassis bracket 48. A region 98 is formed between outer circumference 94 and the chassis aperture 96. The size of the region 98 depends on a predetermined range of rotation of the tension strut and the amount of radial vibration isolation required for a particular design.

The sleeve 51 also includes a bore 88 axially passing through each portion 82, 84, 86. The bore 88 includes a non-circular section 90 for matingly engaging a similar non-circular segment 92 of the forward end 44 of the tension strut 42. The mating non-circular geometry may include mating flat portions providing only one possible correct orientation, or alternatively substantially elliptical geometries and the like may be used to provide multiple correct orientations.

In the preferred embodiment, the sleeve 51 further includes a radial flange 100 extending outward from the end of the second portion 84 of the sleeve 51. The radial flange 100 has an outer diameter substantially equal to that of the second elastomeric body.

Also in the preferred embodiment, the non-circular outer circumference of the center portion 86 continues over the first and second portions 82, 84 of the sleeve 51. Similarly, the first and second apertures 54, 60 take on a non-circular geometry to match that of the respective portions 82, 84. As above, this mating non-circular geometry may include mating flat portions providing only one possible correct orientation, or alternatively substantially elliptical geometries and the like may be used to provide multiple predetermined orientations. Additionally, the first body 52 includes a protuberance 56 which extends through the region 98 into the second aperture 60. This permits the protuberance 56 to provide radial vibration isolation and act as a seal against the ingress of contaminants to the region 98.

It should be readily apparent to those skilled in the art that the indexing and anti-rotation function disclosed could be accomplished by many different shapes, including, but not limited to, non-circular shapes, such as star or a non-equilateral triangle and even circular shapes, such as non-concentric circular apertures.

The first and second bodies 52 and 58 are preferably formed by means of vulcanizing a rubber material to provide a resilient body for isolating the chassis 10 from vibrations generated at the wheel support member 26. The present invention is not so limited, as the elastomeric bodies may be constructed from many elastomeric materials including natural rubbers and synthetics such as polyurethane. The sleeve 51 may be constructed from steel, however, this does not limit the variety of materials that would function equivalently. Plastics and composites as well as other metals including, but not limited to, powdered metal alloys and aluminum could satisfactorily be substituted for steel.

The present invention is useful during the assembly of the vehicle as well as throughout the entire life of the vehicle.

During assembly, the operator slides a conventional first washer 64 and the first body 52 over the forward end 44 of the strut 42 until washer 64 contacts a shoulder 70. The partial assembly is inserted into the chassis aperture 96 in the chassis bracket 48 with the protuberance 56 in the predetermined orientation. Next, the operator slides the second body 58 in its predetermined orientation onto the strut end 44 and the protuberance 56. The operator next installs the sleeve 51 onto forward end 44 and into the first and second apertures 54, 60 and the chassis aperture 96.

A clamping force secures the suspension attachment 46 to the chassis bracket 48 by compressing the bodies 52, 58 about the perimeter of the chassis aperture 96. The clamping force is generated when the operator tightens the threaded rod fastener 68, which compresses the first and second bodies 52, 58 between the radial flange 100 and the washer 64.

In operation, dynamic loading of the tension strut 42 applies a moment to the suspension attachment 46. The non-circular outer circumference 94 of the sleeve 51 cooperates with the non-circular chassis aperture 96 within the chassis bracket 48 to isolate rotational vibrations and ultimately to limit the rotational excursions of the tension strut 42 within a predetermined range indicated by θ through metal to metal contact.

The foregoing description presents one embodiment of the present invention. Details of construction have been shown and described for purposes of illustration rather than limitation. Modifications and alterations of the invention will no doubt occur to those skilled in the art that will come within the scope and spirit of the following claims.

What is claimed:

1. A suspension for a vehicle comprising:

a chassis;

a wheel support member;

an upwardly extending telescopic damper having a lower end secured to said wheel support member and an upper end connected to said chassis;

transversely extending front and rear control arms, each of said control arms having an inboard end pivotably connected to said chassis and an outboard end connected to said wheel support member;

a tension strut having a rearward end pivotally connected to said wheel support member and a forward end adapted to be attached to said chassis; first elastomeric body having a first aperture;

a second elastomeric body having a second aperture being adapted to be axially aligned with said first aperture when said first and second elastomeric bodies are clamped to said chassis;

a sleeve having a first portion disposed in said first aperture, a second portion opposite said first portion and disposed in said second aperture, and a center portion disposed therebetween;

said sleeve further includes a bore passing through said sleeve for receiving said tension strut therein and operatively preventing relative rotation between said tension strut and said sleeve;

said center portion of said sleeve includes a non-circular outer circumference for engaging a non-circular chassis aperture disposed on said chassis and forming a region therebetween, said region being operative to permit rotations within a predetermined range of said sleeve and said tension strut relative to said chassis.

2. A suspension according to claim 1, wherein said tension strut includes a shoulder adjacent to a disk to prevent axial displacement of said tension strut.

3. A suspension according to claim 1, wherein said non-circular outer circumference, said non-circular chassis aperture and said first arid second apertures include a flat portion thereon.

4. A suspension according to claim 1, wherein said tension strut includes a predetermined radius of curvature.

5. A suspension according to claim 1, wherein said first elastomeric body includes a protuberance that extends into said region, thereby providing radial vibration isolation.

6. A suspension according to claim 1, wherein said non-circular outer circumference, said non-circular chassis aperture and said first and second apertures are substantially elliptical.

7. A suspension according to claim 1, wherein said bore in said sleeve and a portion of said tension strut therein are substantially elliptical.

\* \* \* \* \*